United States Patent
De Boursetty et al.

(10) Patent No.: US 7,581,109 B2
(45) Date of Patent: Aug. 25, 2009

(54) DELEGATION OF ELECTRONIC SIGNATURE BY MULTI-AGENT CRYPTOGRAPHY

(75) Inventors: Benoît De Boursetty, Paris (FR); Laurent Frisch, Paris (FR); Dimitri Mouton, Paris (FR)

(73) Assignee: France Telecom, Paris (FR)

( * ) Notice: Subject to any disclaimer, the term of this patent is extended or adjusted under 35 U.S.C. 154(b) by 703 days.

(21) Appl. No.: 10/732,808

(22) Filed: Dec. 11, 2003

(65) Prior Publication Data
US 2004/0139325 A1    Jul. 15, 2004

(30) Foreign Application Priority Data
Oct. 31, 2002    (FR)    .................................. 02 13721

(51) Int. Cl.
*H04L 9/00*    (2006.01)
(52) U.S. Cl. ....................................................... 713/180
(58) Field of Classification Search .................. 713/180
See application file for complete search history.

(56) References Cited

U.S. PATENT DOCUMENTS

| | | | | |
|---|---|---|---|---|
| 5,825,880 A | * | 10/1998 | Sudia et al. | ............... 713/180 |
| 6,839,436 B1 | * | 1/2005 | Garay et al. | ............... 380/278 |
| 2003/0145223 A1 | * | 7/2003 | Brickell et al. | ............. 713/201 |

OTHER PUBLICATIONS

Sun, H-M et al., Threshold Proxy Signatures, IEE Proc.-Computers & Digital Techniques, vol. 146, No. 5, Sep. 1999, pp. 259-263.
Yi, L. et al., Proxy Multi-Signature Scheme: A New Type of Proxy Signature Scheme, Electronics Letters, Mar. 16, 2000, vol. 36, No. 6.

* cited by examiner

*Primary Examiner*—Kambiz Zand
*Assistant Examiner*—Harris C Wang
(74) *Attorney, Agent, or Firm*—Lowe Hauptman Ham & Berner LLP

(57) ABSTRACT

For signing of data by a given one of M delegates mandated by N titleholders, where $M \geq 2$ and $N=1$ or $M=1$ and $N \geq 2$, the terminal of the given delegate reads in a delegation server information on the delegates and the titleholders of the group thus constituted. The data and the information read and a private key of the given delegate are applied to a cryptographic algorithm to produce a signature which therefore carries a cryptographic delegation mark. The data, information, and signature are transmitted to a user terminal that can trace the characteristics of the signature delegation.

18 Claims, 3 Drawing Sheets

DELEGATION OF ELECTRONIC SIGNATURE BY MULTI-AGENT CRYPTOGRAPHY

RELATED APPLICATIONS

The present application is based on, and claims priority from, French Application Number 0213721, filed Oct. 31, 2002, the disclosure of which is hereby incorporated by reference herein in its entirety.

BACKGROUND OF THE INVENTION

1. Field of the Invention

The present invention relates to an electronic signature delegation method whereby a delegate can execute an electronic signature on predetermined data in his terminal in the name of at least one titleholder who has mandated the delegate.

2. Description of the Prior Art

An electronic signature guarantees the authenticity of a document, i.e. securely authenticates one or more signatories having executed the signature, and guarantees that the document has not been tampered with. The electronic signature is often used to guarantee non-repudiation of the document, i.e. to guard against denial of the document by its author.

The formats most routinely used for signed messages are the standardized PKCS#7, CMS, XML-DSig and PGP formats.

Known electronic signature formats offer no means for including an annotation of signature delegation. The use of multi-agent cryptography, which assures the anonymity of a signatory belonging to a group of agents by signing in the name of the group, allows the inclusion of sufficient information for managing signature delegation in a pre-specified context of signature validity.

Some of the signature formats previously cited enable integration of a plurality of signatures into a single file. On the other hand, they are not adapted to collect signatures issued by a group.

At present, few electronic signature systems provide for signature delegation.

Where signature delegation does exist in an electronic signature system, it generally relates to delegation of rights, with means for managing authorizations effected internally by the system, in the most favorable cases via a more general directory.

For example, a group of "titleholders" who have the right to take decisions within the system can be defined in a workflow. To alleviate titleholder absences, one or more "delegates" can be attached to each of the titleholders.

A titleholder can decide, for example at the time of an action in the workflow such as a declaration of paid leave, to assign some or all of the titleholder's authorizations to the delegate for a predetermined delegation period in order not to cause discontinuity in the workflow. Decisions in the workflow taken by the delegate are taken in the name of the titleholder.

All trace of the delegation is usually lost when the delegation period ends. In the most favorable situations, the delegation can be uncovered from workflow logs, but this requires a complex and costly search operation, especially if the search is conducted a long time afterwards.

In the case of workflows including an electronic signature, in which case the object of the decision is the electronic signing of a document, existing electronic signature formats do not provide a "signed on behalf of" field identifying the titleholder in whose name the signature has been effected by the delegate. The signed document, once it has left the workflow, for example for processing by a third party or archival storage, includes only the signature of the delegate, with no trace of the person in whose name the delegate effected the signature.

Because the delegation of power is not included in the electronic signature, it cannot be uncovered once the signed document has left its delegation context.

Now, the electronic signature must be durable, and the elements for determining the conditions under which the signature was executed must likewise remain durable, for example by adding the written annotation "per pro" in the case of a manuscript signature.

Furthermore, delegation often necessitates, for the titleholder and/or the delegate, intervention by the management means for authorizing delegation.

To show that a manuscript signature is effected on behalf of someone else, the manual signature on the signed document is followed by a handwritten annotation of the "per pro" type. This method can be reproduced identically in an electronically signed document if a field to accommodate this kind of annotation is provided in the format of the document to be signed.

Unfortunately, there is no such field, and adding within the format of the document it is difficult. Semantic analysis of the content of the document is necessary to recover information relating only to the signature.

It will be noted that it is very often the case, in forms or in workflows, that an electronic signature does not apply to the document, such as a formatted text, but rather to a set of data concatenated into a string of characters belonging to the electronic document and which may or may not be displayable.

The conventional electronic signature as described above transposes the manuscript signature mechanism into the electronic domain. Another form of electronic signature, based on multi-agent cryptography techniques, offers not only features that are close to the basic signature, such as some degree of guarantee as to the source of a message, but also features that are radically different, such as the anonymity of the signatory within a group of persons. Three techniques are described hereinafter:

the group-signature technique, in which the signature is effected by a member of a group administered by an authority;

the set-signature technique, in which the signature is effected by a person in the name of a set of persons without them being part of an administered group; and the trivial multi-agent signature technique, in which information on other agents that it is required to include in the signature process is added.

The group-signature technique involves at least one signatory, a group of members to which the signatory belongs, and an authority. A member of the group signs in the name of the group, but anonymously. When an entity validates a group signature, it is certain that the signature has been effected by one of the members of the group, without being able to tell which one. Only one entity is authorized to determine the identity of the signatory, namely the authority. In this case, it is said that the authority "opens" the signature and that the group signature is of "limited anonymity". The anonymity can be beneficially lifted, in particular in the event of fraud or to ensure the correct operation of a service, for example bidding.

As a general rule, the group-signature technique necessitates an initialization phase and uses specific cryptographic keys.

Furthermore, the group-signature technique requires the group administrator to manage the group using complex operations for adding a new member to the group and removing a member from the group.

The set-signature technique differs from the group-signature technique in that:

the persons of the set in whose names the signatory applies his set signature do not belong to a group, i.e. are not registered as forming part of a group, and thus have not given their explicit consent;

there is no authority; and unless the signatory is explicitly mentioned, anonymity cannot be lifted.

It is nevertheless assumed that all potential signatories have public keys accessible to the signatory. No configuration phase is needed. As there is no authority, the set signature offers complete anonymity, i.e. nobody can ever determine who is the actual signatory.

The set-signature technique has three main drawbacks. The first is its irrevocable anonymity, which is sometimes a highly undesirable property. The second is the presumed slowness, and therefore data processing cost, of signature and verification, especially when the number of persons in the set is high. The third is recovering the certificates of all the persons of the set.

The trivial multi-agent signature method relies on a fundamental object establishing confidence in a public key associated with a private key for a titleholder or delegate user. The object referred to is an electronic certificate issued by a certification authority. It includes in particular the public key to be certified, the identity of the holder of the public key, a certificate validity period, a list of key usage attributes corresponding to rights of use of the key, supporting parameters such as a message signature key or a secure web server key, for example, and a cryptographic signature of the above data contained in the certificate and generated using a private key of the certification authority that issued the certificate. Confidence in the public key associated with a user identity relies on the validity of the certificate.

In the trivial multi-agent signature method, the signatory applies his signature to a document using the standard method and, in an additional field, adds, in addition to his own certificate, the certificates of the other agents that the signatory wishes to involve in the signature, and where applicable a field to be filled in with additional information. For example, in the case of delegation, the delegate includes his own certificate, the titleholder certificate, and a field indicating "per pro".

The certificates added in this way are not necessary or useful for verifying the signature, and are present only for information. They can perfectly well be removed, or others can be added, without this modifying the signature. The format of the additional field is not standardized, even if it can be included in the form of a non-authenticated attribute.

OBJECT OF THE INVENTION

The object of the present invention is to remedy the drawbacks of the prior art electronic signature techniques in the context of delegation applying to the signature and relating to a group or set of several members in order to provide in the signature of the delegate a priori multi-agent cryptographic proof of the delegation for subsequently tracing the titleholder(s) in whose name the signature was executed.

SUMMARY OF THE INVENTION

To reach this object, a method of delegating signing of predetermined data by a given one of M first members mandated by N second members, M and N being integers of which one is equal to 1 and the other is at least equal to 2, the given first member having a terminal containing first information on the given first member, is characterized in that it comprises the following steps:

reading first information on the M first members and second information on the N second members in delegation means from the terminal responsive to a first identifier of the given first member included in the first information and transmitted by the terminal to the delegation means, applying the predetermined data, the first information, the second information, and a first private key of the given first member to a cryptographic algorithm implemented in the terminal to produce a signature, and transmitting the predetermined data, the first information, the second information, and the signature to any user terminal interested in the predetermined data.

For example, the above steps follow on from verification of predetermined data in the terminal of the given first member.

Accordingly, this signature applies not only to the predetermined data, such as a digitized document processed by the given first member, in his capacity as delegate, in the name of M second members, in their capacity as titleholders, but also to first information on the first N members and second information on the M second members, and thus contains a multimember cryptographic delegation mark. This information, formatted and transmitted with the data and the signature, preferably provides for a posteriori tracing in the user terminal of the N second members, i.e. the titleholder(s) who mandated the given first member as delegate.

According to a first variant, the integer M is equal to 1 and the integer N is at least equal to 2.

According to a second variant, the integer N is equal to 1 and the integer M is at least equal to 2.

According again to another variant, the M first members and the N second members constitute a group or set of members.

BRIEF DESCRIPTION OF THE DRAWINGS

Other features and advantages of the present invention will become more clearly apparent on reading the following description of a number of preferred embodiments of the invention, which description is given with reference to the corresponding appended drawings, in which.

DETAILED DESCRIPTION OF THE DRAWINGS

Figure 1:
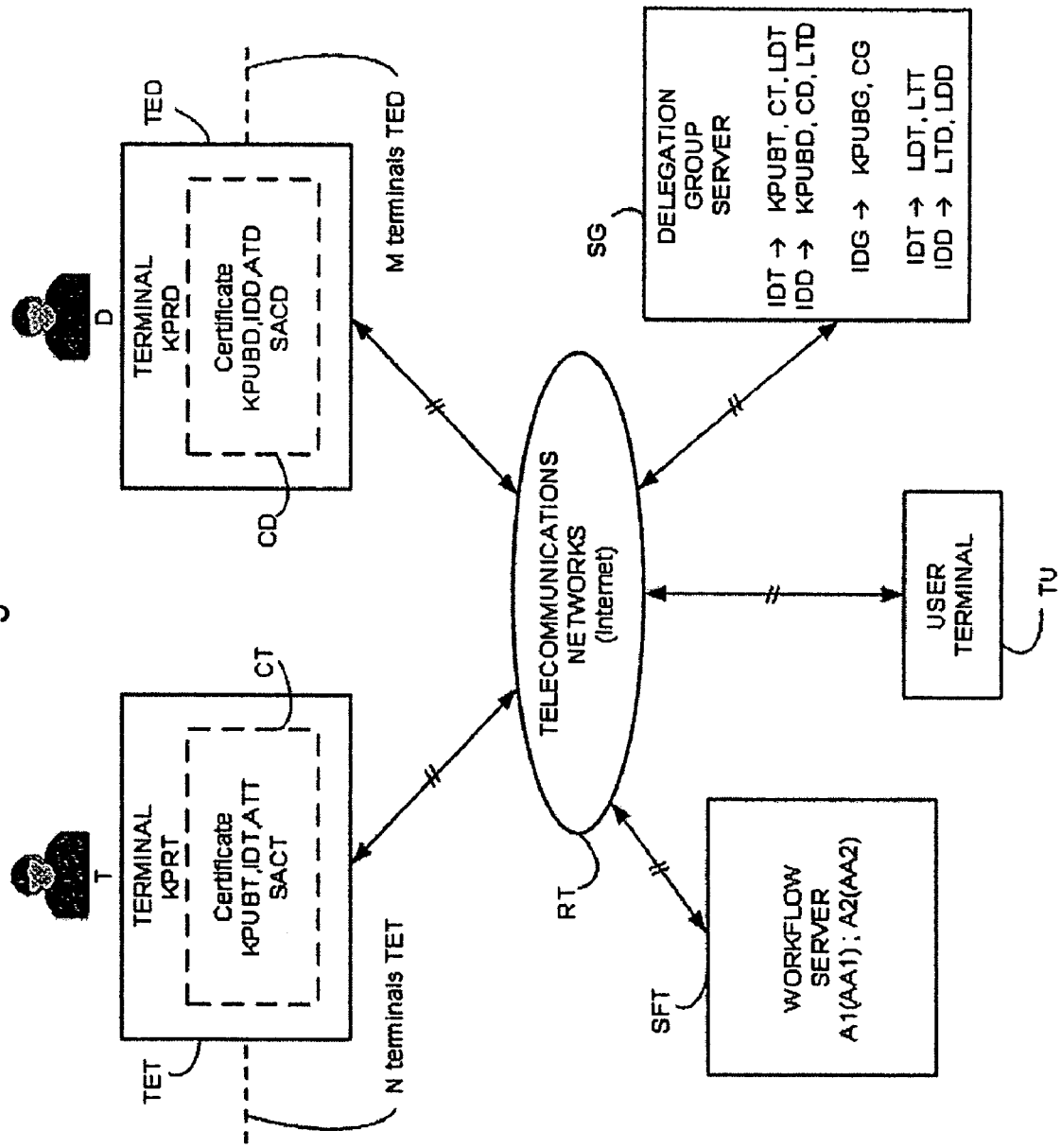
FIG. 1 is a block schematic of a telecommunication system with at least three terminals including at least one titleholder terminal and one delegate terminal for implementing the electronic signature delegation method according to the invention.

Referring to FIG. 1, a telecommunication system capable of using the electronic signature delegation method according to the invention is described hereinafter in the context of a workflow.

The telecommunication system essentially comprises servers SFT and SG connected to a telecommunication network RT, here comprising the Internet, and user terminals, such as terminals TET, TED and TU, connected to the Internet by access networks in the network RT.

The server SFT is a workflow server which distributes tasks between a plurality of user terminals of at least one predetermined group. A group G comprises N+M user members, N and M being integers of which one is at least equal to 1 and the other is at least equal to 2. Thus a group can comprise at least three members, i.e. N=1 titleholder T and M≧2 delegates D mandated by the titleholder T, or according to another variant comprise N≧2 titleholders T and M=1 common delegate D mandated by the titleholders.

In order not to overcomplicate FIG. 1, there is shown therein, for one group, only one terminal TET of a titleholder T, from N titleholder terminals, and one terminal TED of a delegate D, from M delegate terminals. For example, the terminals TED and TET are personal computers and the network RT is an Ethernet local area network (LAN) or wireless area network (WAN), or comprises access networks connected by the Internet. In a different example, at least one of the terminals TET and TED is a mobile radio telephone and the network RT further comprises the digital cellular radio telephone network that the mobile radio telephone use. In other examples, at least one of the terminals TET and TED can be a portable electronic device such as a personal digital assistant (PDA) or a portable computer.

The terminals TET, TED can be in different places and work at different times and in different ways on common projects via the workflow server SFT. The server SFT contains a management software for managing a set of repetitive tasks along a work circuit. The management software organizes the work along the workflow by federating digitized documents and digital data between the group members. The main functions of the server SFT are managing working procedures, coordinating loads and resources between the terminals of the group members, and supervising the progress of operations between them.

Here the workflow necessitates the engagement of the responsibility of the members of the group that participate therein. That engagement is reflected by electronic signatures of the members of the group on documents, or more generally on predetermined data, that they have respectively processed. Delegation by some members of the group, called titleholders, to other members, called delegates, is often included, and takes the form of a management of authorizations effected by the second server SG, which is known as the delegation group server.

The delegation group server SG, which can be combined with the server SFT, includes a directory or database including all the information necessary for identifying each of the members of a plurality of groups and for producing electronic signatures. For example, each member T, D of the group G is designated by an identifier IDT, IDD corresponding to an electronic certificate CT, CD. The certificate CT, CD contains in particular the identifier IDT, IDD, a public key KPUBT, KPUBD, a certificate validity period, a delegate identifier list LDT, LDD and/or a titleholder identifier list LTT, LTD, where applicable key usage attributes ATT, ATD, etc, and finally a cryptographic signature SACT, SACD of the data contained in the certificate using a public key of the certification authority that issued the certificate.

Alternatively, the group G itself is identified by an identifier IDG to which there correspond a certificate CG of the group and a public key KPUBG of the group. The group server SG therefore stores the relations between the members of each group present: in particular, the identifier IDT, IDD of each user T, D gives access to a list of titleholders LTT, LTD who have mandated the user as delegate and/or a list of delegates LTD, LDD who have been mandated as delegates by the user.

According another variant the tables of the data included in the group server SG are implemented in the form of a database in each of the user terminals TET, TED.

Figure 2:
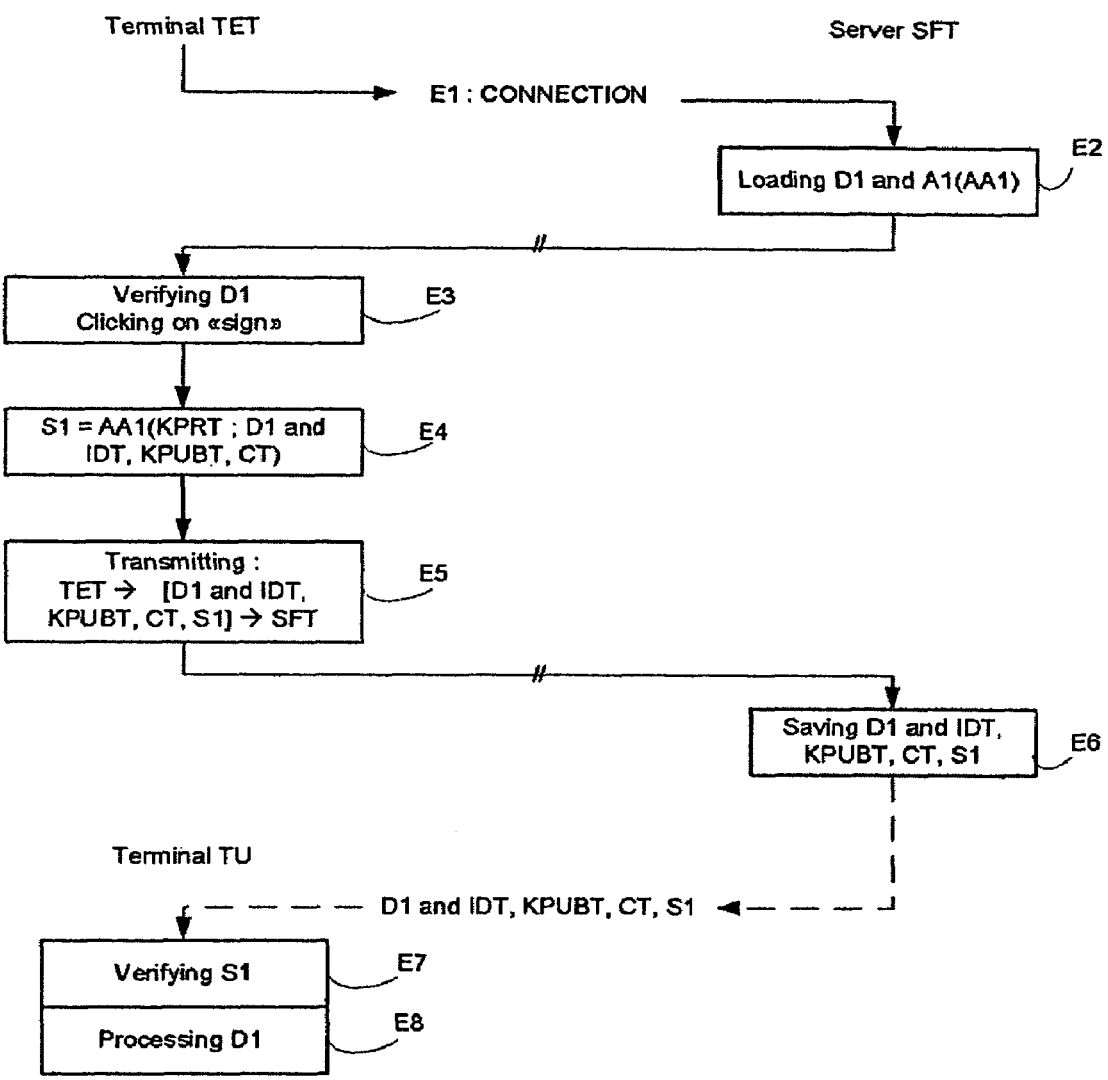
FIG. 2 is an algorithm of the main steps of a prior art technique for a titleholder user to execute an electronic signature.

Referring now to FIG. 2, the titleholder T signs in a manner that is known in the art data D1 in his terminal TET, such as a digital document, transmitted by the workflow server SFT in main steps E1 to E6.

In the initial step E1, the terminal TET is connected to the server SFT via the network RT. The server SFT commands the display of a task involving signing predetermined data D1, which the titleholder T must sign in the terminal TET. For example, this signature task arises after formatting of the data D1 by the server SFT following modification of the data D1 by the titleholder T via his terminal TET.

Then, in step E2, the terminal TET requests the server SFT to download one or more pages containing the data D1 to be signed and a signature applet A1. Alternatively, the applet A1 is already installed in the terminal TET or is downloaded from a specialist server separate from the workflow server SFT.

In step E3, the titleholder T verifies on the screen of the terminal TET that the received data D1 is in fact that to be signed. The user T then decides to sign the data D1, for example by clicking on a "sign" button, which starts the execution of an asymmetrical cryptographic algorithm AA1 at least part of which can be included in the applet A1. The algorithm AA1 is executed on the data D1 as a function of a private key KPRT of the titleholder T corresponding to the public key KPUBT. The private key KPRT of the titleholder T is held in a removable or non-removable secure memory of the terminal TET. The algorithm AA1 is implemented either in the terminal or in the secure memory, which can be a smart card.

In step E5, the data D1 and at least one parameter such as the identifier IDT for identifying the titleholder T and thus finding out his public key KPUBT, and the electronic signature S1 resulting from the execution of the algorithm AA1 are transmitted by the terminal TET to the server SFT via the network RT. Then, in step E6, the server SFT saves the data D1 with the signature S1.

Subsequently, in steps E7 and E8, the terminal TU of a user wishing to obtain access to the document D1 requests transmitting of the document D1 with the signature S1, and verifies the signature S1 in order to process the data D1 if the signature S1 is validated. The signature S1 is deemed to be valid if the data D1 is the result of executing the asymmetrical algorithm AA1 to which the public key KPUBT of the titleholder T and the transmitted signature S1 are applied in order to recover data D1' that must be identical to the data D1 received.

In other embodiments, not only data D1 but also the titleholder certificate CT or a portion of the certificate CT, such as at least the identifier IDT and the public key KPUBT, are applied as data to the authentication algorithm AA1 in the terminal TET, to produce, in step E15, the signature S1 that was transmitted with the data D1 and the certificate CT in step E5.

Figure 3:
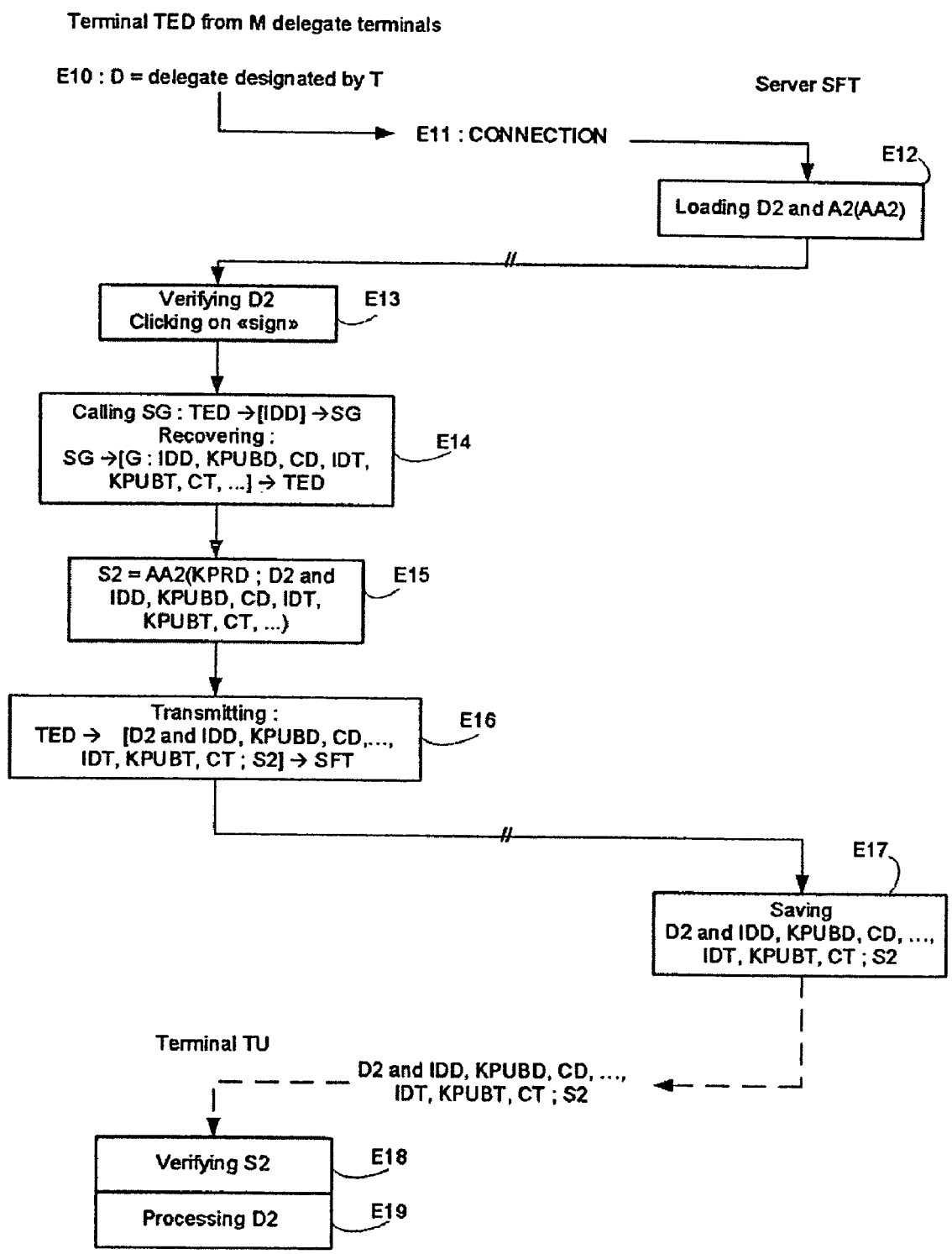
FIG. 3 is an algorithm of the main steps of the electronic signature delegation method according to the invention.

Referring to FIG. 3, the following steps E10 to E17 are executed for a given delegate D among from M delegates, where M≧2, to execute a signature on predetermined data D2 in the name of and on behalf of a titleholder T, analogous to the signature S1 produced previously, The titleholder T has initially mandated the M delegates D to sign documents in step E10. The group server has registered that delegation by introducing the identifier IDT of the titleholder T into the titleholder lists LTD linked to the identifiers IDD of the M delegates and the identifiers IDD of the delegates into the delegate list LDT linked to the identifier IDT of the titleholder T.

In step E11, the terminal TED of the given delegate D and the server SFT are connected via the network RT. The given delegate D is advised of the signature task that it has to effect in the name of the titleholder T. The signature task is displayed in the terminal TED under the control of the server SFT, for example after constitution of a digitized document forming predetermined data D2 formatted by the server SFT, or after revision of the document by the given delegate D, who was invited to effect this task by the titleholder T.

In the next step E12, the terminal TED requests the server SFT to download one or more pages containing the data D2 to be signed and a signature applet A2. The signature applet A2 downloaded in this way into the terminal TED contains at least part of a small program for effecting a signature data D2 in the name of the group G consisting at least of the titleholder T and the M delegates, rather than a simple electronic signature S1 as in the prior art method shown in FIG. 2. Alternatively, the signature applet A2 is already installed in the delegate terminal TED or is downloaded from a server dedicated to signature applets and separate from the workflow server SFT.

In step E13, the delegate D verifies that the document displayed on the screen of the terminal TED corresponds to the data D2 to be signed. If the result of this verification is positive, the delegate D initiates the subsequent steps E14, E15 and E16 in the terminal TED contributing to the formation of the signature on the received data D2 in the name of the group consisting of the titleholder T and the M delegates. For example, execution of this signature is initiated by clicking on a "sign" button, or with or without intervention of a removable secure memory that is inserted into the terminal TED at this time or beforehand, and which holds at least one private key KPRD of the given delegate D.

In step E14, the terminal TED calls the delegation group server SG, which can be managed by the administrator of the workflow server SFT. The terminal TED reads the directory or the database of the server SG and retrieves first information on the M delegates of the group G(T, N, D) and second information on the titleholder T. This recovery of information is authorized by the server SG after it has verified that the given delegate D has received a delegation of power from the titleholder T, in response to the identifier IDD transmitted by the terminal TED, i.e. if the list LTD associated with the identifier IDD of the given delegate contains the identifier IDT. The information recovered on the group G is public information on the members of the group G, in particular their identities IDT, IDD, their public keys KPUBT, KPUBD, and their certificates CT, CD. Alternatively, the information recovered contains the group identifier IDG and the group certificate CG, and therefore the public key KPUBG of the group G. The information specific to the given delegate D, such as the certificate CD, which is already held in memory in the terminal TED, is preferably omitted from the information recovered.

An electronic signature S2 is executed on the data D2 in step E15. The signature S2 is the result of executing an asymmetrical cryptographic algorithm AA2 at least part of which can be included in the downloaded applet A2. At least the data D2 and a private key KPRD of the given delegate D that corresponds to the public key KPUBD and is in the removable or non-removable secure memory of the terminal TED in which the algorithm AA2 is implemented are applied to the algorithm AA2.

According to the invention, first information on the M delegates of the group G including the identifiers IDD and/or the public keys KPUBD, or more completely the electronic certificate CD of the delegates of the group and second information including the identifier IDT and/or the public key KPUBT or more completely the electronic certificate CT of the titleholder T, which for the most part were recovered by the terminal TED in the preceding step E14, are applied as data to the algorithm AA2 in addition to the data D2. Instead of applying to the algorithm AA2 all or part of the first information previously cited and all or part of the second information previously cited, global information on the group G, such as the identifier IG and/or the public key KPUBG, or more completely the electronic certificate CG of the group, are applied to the algorithm AA2 in addition to the data D2. The global information on the group G enables a user to whom the signed data D2 is addressed to trace the first and second information on the M delegates and the titleholder T and thus on the members of the group. The first information on the given delegate that signed is preferably concatenated firstly with the information on the other delegates and the second information on the titleholder.

In step E16, the data D2, the signature S2 resulting from the execution of the cryptographic algorithm AA2, and at least the first and second information KPUBT, KPUBD and/or IDT, IDD or CT, CD, or IDG and/or KPUBG or CG on the group G, having been applied to the algorithm AA2, are transmitted from the terminal TED to the workflow server SFT via the network RT.

In step E17, the server SFT then saves the data D2 and the first and second information transmitted with the signature S2.

Subsequently, in steps E18 and E19, the terminal TU of a user who requires to access the data D2 requests transmission of the data D2 with said first and second information and the signature S2 saved in the preceding step E17 and verifies the signature S2 in order to process the data D2 if the signature S2 is valid. The signature S2 is deemed to be valid if the data D2 is the result of executing the asymmetrical algorithm AA2 to which the public key KPUBD of the given delegate D, the signature S2 and the transmitted information KPUBT, KPUBD and/or IDT, IDD or CT, CD, or IDG and/or KPUBG or CG are applied in order to recover data D2' that must be identical to the data D2 received, which assures the integrity thereof. The information is used to characterize the members of the group G=(T, (N.D)) for the user and to determine which of the members is the delegate who actually signed. The identity of the signatory can be indicated by the order in which the information is transmitted, by consulting the server SG, by a signatory identifier, or by an annotation of the type "signed by D in the name of T".

In another embodiment of the multi-agent signature method that is the converse of the embodiment with M delegates and one titleholder previously described, the group includes N titleholders, with N≧2, who have delegated powers to one delegate, first information on the delegate and second information on the N titleholders are applied with the data D2 to the cryptographic algorithm AA2 in step E15 and are then transmitted with the data D2 and the signature S2 in step E16.

In other practical embodiments, the Java applets A1 and A2 can be replaced by predetermined scripts or programs independent of any browser written in a language other than Java.

The invention can be applied to a set of members of whom one, the delegate, signs in the name of the set. For the user of the terminal TU to know the identity of the signatory, it is necessary that the first information relating to the delegate additionally contains a signatory indicator.

Alternatively, an intermediate server between the delegate terminal TED and the workflow server SFT can verify authorization of delegation and verify belonging to a group, as in step E14, format and display a signature, as in step E15, verify the cryptographic validity of the signature, as in step E18, time and date stamp the signature, include proof of the validity of a certificate in the signature, etc. The intermediate server and the delegate terminal TED therefore have a role equivalent to that of the delegation server SG and the terminal TED in the embodiment shown in the figures.

Instead of considering a group of at least three members T and D, these members can belong to a set. In this embodiment, the set server replacing the group server knows data relating to the information on the members of the set. To determine which of the members of the set signed, the signature S2 executed by the delegate D is preferably transmitted with at least the identifier IDD and the public key KPUBD of the delegate D, in order for the addressee of the data D2 to recognize the signatory, in this instance the delegate D.

The invention is not limited to an application to workflows, but can be used in the context of publication of documents, teleprocedures, or electronic mail, for example.

What we claim is:

1. A method of delegating signing of predetermined data by a given one of M first members mandated by N second members, M and N being integers of which one is equal to 1 and the other is at least equal to 2, the given first member having a terminal including first information on said given first member, said method comprising the following steps:

reading from said terminal first information on said M first members and second information on said N second members included in delegation means responsive to a first identifier of said given first member included in said first information and transmitted by said terminal to said delegation means, said second information on a second member comprising at least an identifier of said second member, concatenating in said terminal (a) predetermined data, (b) said first information and (c) said second information into concatenated data, signing said concatenated data by using a first private key of said given first member in a cryptographic algorithm included in said terminal to produce a signature, and transmitting, from said terminal, said concatenated data, and said signature to any user terminal interested in said predetermined data.

2. The method claimed in claim 1 wherein said second information on a second member further comprises a public key of said second member.

3. The method claimed in claim 1 wherein said second information on a second member further comprises an electronic certificate of said second member.

4. The method claimed in claim 1 wherein said first information on a first member comprises an electronic certificate of said first member.

5. The method claimed in claim 1 wherein said integer M is equal to 1 and said integer N is at least equal to 2.

6. The method claimed in claim 1 wherein said integer N is equal to 1 and said integer M is at least equal to 2.

7. The method claimed in claim 1 wherein said M first members and said N second members constitute a group of members.

8. The method claimed in claim 1 comprising loading predetermined data and a signature program including at least part of said cryptographic algorithm from at least one server connected to said terminal of said given first member before verification of said predetermined data by said given first member.

9. An apparatus for delegating signing of predetermined data, said apparatus of a given one of M first members mandated by N second members, M and N being integers of which one is equal to 1 and the other is equal to 2, the apparatus including first information on said given first member and comprising:

a reading arrangement for reading first information on said M first members and second information on said N second members, the reading arrangement being arranged to be responsive to a first identifier of said given first member which is included in said first information and which is to be transmitted by said apparatus to said delegation arrangement, said second information on a second member comprising at least an identifier of said second member, a concatenating arrangement for concatenating (a) predetermined data, (b) said first information and (c) said second information into concatenated data, a signing arrangement for signing said concatenated data by using a first private key of said given first member in a cryptographic algorithm included in said apparatus to produce a signature, and a transmitter arrangement for transmitting said concatenated data, and said signature to any user terminal interested in said predetermined data.

10. The apparatus of claim 9, wherein said second information on a second member further comprises a public key of said second member.

11. The apparatus of claim 9, wherein said second information on a second member further comprises an electronic certificate of said second member.

12. The apparatus of claim 9, wherein said first information on a first member comprises an electronic certificate of said first member.

13. The apparatus of claim 9, wherein said integer M is equal to 1 and said integer N is at least equal to 2.

14. The apparatus of claim 9, wherein said integer N is equal to 1 and said integer M is at least equal to 2.

15. The apparatus of claim 9, wherein said M first members and said N second members constitute a group of members.

16. The apparatus of claim 9, further comprising a loading arrangement for loading said predetermined data and a signature program including at least part of said cryptographic algorithm from at least a server connected to said apparatus before verification of said predetermined data by said given first member.

17. The apparatus of claim 9 wherein the predetermined data include a digitized document.

18. The method of claim 1 wherein the predetermined data include a digitized document.

* * * * *